US011995093B1

(12) United States Patent
Beer et al.

(10) Patent No.: US 11,995,093 B1
(45) Date of Patent: May 28, 2024

(54) SYSTEMS AND METHODS FOR DIMENSIONAL REDUCTION OF CATEGORICAL DATA

(71) Applicant: Anaplan, Inc., San Francisco, CA (US)

(72) Inventors: Yair Yaakov Beer, Netanya (IL); Maya Bercovitch, Neve-Yamin (IL)

(73) Assignee: Anaplan, Inc., San Francisco, CA (US)

( * ) Notice: Subject to any disclaimer, the term of this patent is extended or adjusted under 35 U.S.C. 154(b) by 65 days.

(21) Appl. No.: 17/731,439

(22) Filed: Apr. 28, 2022

(51) Int. Cl.
*G06F 7/00* (2006.01)
*G06F 16/2458* (2019.01)
*G06Q 30/0201* (2023.01)

(52) U.S. Cl.
CPC ..... *G06F 16/2477* (2019.01); *G06Q 30/0201* (2013.01)

(58) Field of Classification Search
CPC .............. G06F 16/2477; G06Q 30/0201
USPC ................................................. 707/600–899
See application file for complete search history.

(56) References Cited

U.S. PATENT DOCUMENTS

2019/0066133 A1* 2/2019 Cotton ............... G06Q 30/0202

\* cited by examiner

*Primary Examiner* — Isaac M Woo
(74) *Attorney, Agent, or Firm* — Chamberlain, Hrdlicka, White, Williams & Aughtry; Aly Z. Dossa

(57) ABSTRACT

A method for processing categorical data in a time series includes: obtaining the time series where the time series includes a plurality of time series entries; generating, for each of the time series entries, a categorical data component and a supporting component; generating, using the supporting component and the categorical data component, a combined categorical data component specifying a linear effect of the categorical data component on each of the time series entries; predicting, using the combined categorical data component, a future forecast of the categorical data of the time series; and displaying, on a display, the future forecast of the categorical data to a user.

14 Claims, 8 Drawing Sheets

| Dates | New Year's Day | ... | Christmas | ... | Trend | Historical |
|---|---|---|---|---|---|---|
| 1/1/2015 | 1 | 0 | 0 | ... | 0 | 8 |
| ... | ... | ... | ... | ... | 1 | ... |
| ... | 0 | ... | ... | ... | ... | ... |
| ... | 0 | ... | ... | ... | ... | ... |
| 12/24/2020 | 0 | 0 | 1 | 0 | ... | 110 |
| ... | ... | ... | ... | ... | ... | ... |
| 12/31/2020 | 0 | 0 | 0 | 0 | 364 | 87 |

301A
Table A

FIG. 3.1

Table A (301A)

| Dates | New Year's Day | ... | Christmas | ... | Trend |
|---|---|---|---|---|---|
| 1/1/2015 | 300 | 0 | 0 | 0 | 0 |
| ... | | | | | 2 |
| ... | 0 | | | | ... |
| ... | 0 | | | | ... |
| 12/24/2021 | 0 | 0 | -50 | 0 | ... |
| ... | | | | | ... |
| 12/31/2021 | 0 | 0 | 0 | 0 | 2×n |

FIG. 3.3

Table B (301B)

| | New Year's Day | ... | Christmas | ... | Trend |
|---|---|---|---|---|---|
| Weight | 300 | 0 | -50 | 0 | 0 |

FIG. 3.2

| Dates | Holidays Component |
|---|---|
| 1/1/2015 | 300 |
| ... | ... |
| ... | ... |
| ... | ... |
| 12/24/2021 | -50 |
| ... | ... |
| 12/31/2021 | 0 |

301C
Table C

FIG. 3.4

| Dates | Holidays Components | National Day | Mid-Autumn Festival |
|---|---|---|---|
| 1/1/2019 | ... | 0 | 0 |
| ... | ... | 0 | 0 |
| 9/13/2019 | 30 | 0 | 30 |
| ... | ... | 0 | 0 |
| 10/1/2019 | 100 | 100 | 0 |
| ... | ... | 0 | 0 |
| 10/1/2020 | 130 | 100 | 30 |
| ... | ... | 0 | 0 |
| 12/31/2020 | ... | 0 | 0 |

301D Table D

FIG. 3.5

| Dates | Holidays Component | Target |
|---|---|---|
| 1/1/2019 | 10 | 30 |
| ... | ... | ... |
| 1/1/2020 | 10 | 10 |
| ... | ... | ... |
| 12/24/2020 | 30 | 30 |
| ... | ... | ... |
| 12/31/2020 | 0 | 10 |

301E Table E

FIG. 3.6

SYSTEMS AND METHODS FOR DIMENSIONAL REDUCTION OF CATEGORICAL DATA

BACKGROUND

Categorical data in a time series may assist users (e.g., data scientists) in gaining insight on various aspects of the time series. However, categorical data is typically presented in a manner where the effects of the categorical data on the time series is not sufficiently conveyed (e.g., a significant amount of information with regard to the effect of different categorical data is lost in the representation of the data). However, users still wish to better understand and visualize the effects of the categorical data on the time series.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3.1-3.6 show an implementation example in accordance with one or more embodiments.

DETAILED DESCRIPTION

Figure 1:
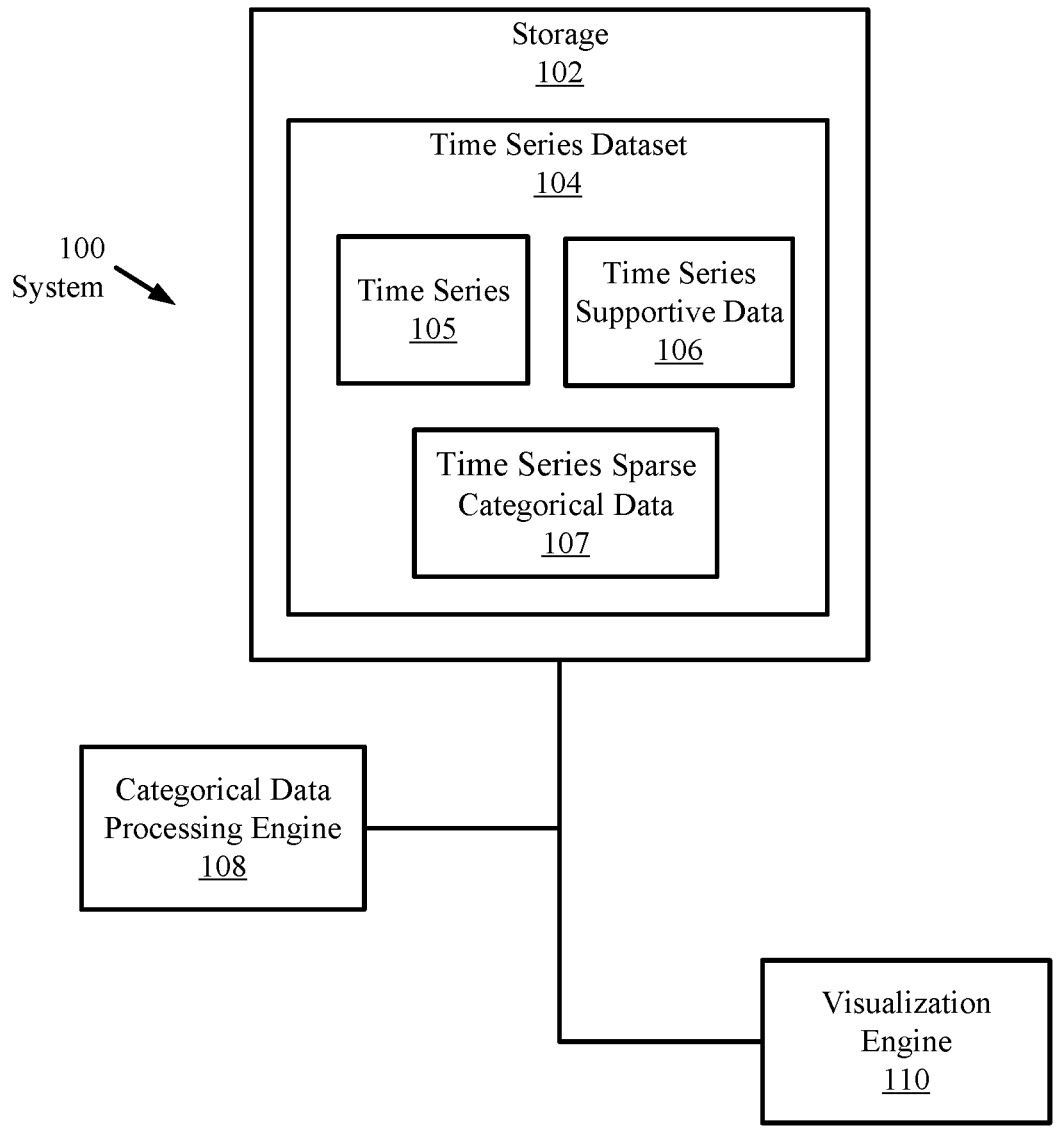
FIG. 1 shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments disclosed are directed to systems and methods for processing categorical data in a time series. In particular, in one or more embodiments disclosed herein, a time series may include categorical data associated with one or more events (e.g., holidays, sales discounts, promotions, anniversaries, birthdays, etc.). Various processes (discussed below in more detail in FIGS. 2-3.6) are executed on the time series to generate values specifying a linear effect of each categorical data on the time series (e.g., a future forecast of the time series, etc.) (also referred to herein as "linear effect value"). This advantageously provides users (e.g., data scientists, customers, etc.) with a better understanding of the effects of each event on the entire time series and/or on additional data generated using the time series. The values specifying the linear effect of each categorical data may also advantageously be used to improve an accuracy of a forecast model generated using the time series. In particular, the inventors observed an accuracy improvement of 8% when the results of one or more embodiments disclosed herein (e.g., the values specifying the linear effect of each categorical data) are used to generate forecast models using a linear algorithm. An accuracy improvement of 15% was observed when the results of one or more embodiments are used to generate forecast models using a deep learning based algorithm.

Various embodiments of the disclosure are described below.

FIG. 1 shows a system (100) in accordance with one or more embodiments. The system includes a storage (102), a categorical data processing engine (108), and a visualization engine (110). In one or more embodiments disclosed herein, the system (100) may be part of a computing system (e.g., 400, FIG. 4). Each of these components of the system (100) will be described in more detail below.

As shown in FIG. 1, the system (100) includes the storage (102). The storage (102) may be implemented using volatile or non-volatile storage or any combination thereof. The storage (102) may be configured to store a time series dataset (104) comprising a time series (105), time series supportive data (106) associated with the time series (105), and time series sparse categorical data (107) associated with the time series (105). The time series dataset (104) may be data structure (e.g., a container and/or one or more lists, tables, collection of data values, etc.) storing information (e.g., data) associated with each of the time series (105), the time series supportive data (106), and the time series sparse categorical data (107). Each time series dataset (104) may be associated with a single (or multiple ones of) the time series (105). Although FIG. 1 only shows the storage (102) storing a single time series data set (104), multiple ones of the time series dataset (104) may be stored in the storage (102) without departing from the scope of one or more embodiments disclosed herein.

In one or more embodiments, the time series (105) may be a series of data points (e.g., entries) indexed, listed, or graphed, in time order over a period of time. The time series (105) may include historical data. An example of a times series (105) is shown below in reference to FIG. 3.1. The time series supportive data (106) may include one or more quantitative values for each entry of the time series (105).

These quantitative values may provide supportive data for the data included in the time series (105) to improve the accuracy of the data included in the time series (105). Such time series supportive data (106) including the quantitative values may also be referred to (as a term of art in the field of data science) as a "related time series." Additionally, the time series supportive data (106) may store the quantitative values in any time format (e.g., hourly, daily, monthly, weekly, yearly, etc.). In one or more embodiments, the time series supportive data (106) may be part of the time series (105) as a single item (e.g., the time series (105) is pre-populated with the data stored in the time series supportive data (106)).

In one or more embodiments, the storage (102) may also store metadata (not shown). The metadata may include descriptive data that does not change over time (i.e., the metadata is not a time series, and is not time independent). Examples of the metadata may include, but are not limited to: an item's color, a store's location, etc. In one or more embodiments, the metadata may be stored as part of any of the time series (105), the time series supportive data (106), and the time series sparse categorical data (107). Alternatively, the metadata may be stored separately (i.e., independently) as its own entity within the storage (102).

In one or more embodiments, the time series sparse categorical data (107) may store information with regard to an event making up one or more categorical data included in the time series (105). For example, assume that the time series (105) covers a daily product sale of a company over the course of two years. The time series sparse categorical data (107) may specify all holidays (e.g., in the form of "holiday" being a category and different holidays such as "New Year's Day" "Christmas Day", and "Independence Day" being sub-categories of the "holiday" category) that occurred over the two years covered by the time series (105). In one or more embodiments, each time series dataset (104) may store multiple ones of the time series sparse categorical data (107) each specifying a different event making up one or more categorical data included in the time series (105). In one or more embodiments, the time series sparse categorical data (107) is not limited to sparse data and may be any type of data (e.g., a normal related time series) that may provide supportive data for the time series (105).

In one or more embodiments, the time series supportive data (106) may include data that covers a first period of time (e.g., one day, two weeks, one year, or any amount of time specified by a user). This first period of time may be the same as (or different from) a period of time covered by the time series (105). In one or more embodiments, the time series sparse categorical data (107) may cover a second period of time that is the same as the first period of time. Alternatively, the second period of time covered by the time series sparse categorical data (107) may be different (e.g., shorter or longer) than the first period of time. For example, assume that the time series (105) and the time series supportive data (106) both cover a first period of time between 1/1/2015-31/12/2020. The time series sparse categorical data (107) may cover a second period of time between 1/1/2015-31/12/2021. In this example, the occurrence of the events in the extra year covered by the time series sparse categorical data (107) may be based on a history of the events taken from data included in the first time period covered by the time series (105) and the time series supportive data (106). Having the time series sparse categorical data (107) cover an additional year within the second period of time allows a future forecast to be generated for the time period of 1/1/2021-31/12/2021 based on the data covered by the first time period of 1/1/2015-31/12/2020.

In one or more embodiments disclosed herein, the system (100) further includes the categorical data processing engine (108). The categorical data processing engine (108) may be implemented in hardware (i.e., circuitry), software, or any combination thereof. In one or more embodiments, the categorical data processing engine (108) may be configured to process (e.g., dimensionally reduce as shown in more detail below in FIGS. 3.1-3.6) categorical data of the time series (105). Additional details of the processes executed by the categorical data in a time series (108) are discussed below in FIGS. 2.1-3.6.

In one or more embodiments disclosed herein, the system (100) further includes the visualization engine (110). The visualization engine (110) may be implemented in hardware (i.e., circuitry), software, or any combination thereof. In one or more embodiments, the visualization engine (110) may be configured to cause a computing system (e.g., 400, FIG. 4) to display data (e.g., the time series (105), the processed categorical data of the time series (105), a future forecast of the time series (105), etc.) associated with any of the processes of one or more embodiments disclosed herein to a user. Additional details processed executed by the data displayed by the visualization engine (110) are discussed below in FIGS. 2.1-3.6.

Although the system (100) is shown as having three components (102, 108, 110), in other embodiments of the invention, the system (100) may have more or fewer components. For example, the functionality of each component described above may be split across components or combined into a single component (e.g., the functionalities of the categorical data processing engine (108) and the feature visualization engine (110) may be combined to be implanted by a single component). Further still, each component (102, 108, 110) may be utilized multiple times to carry out an iterative operation.

Figure 2:
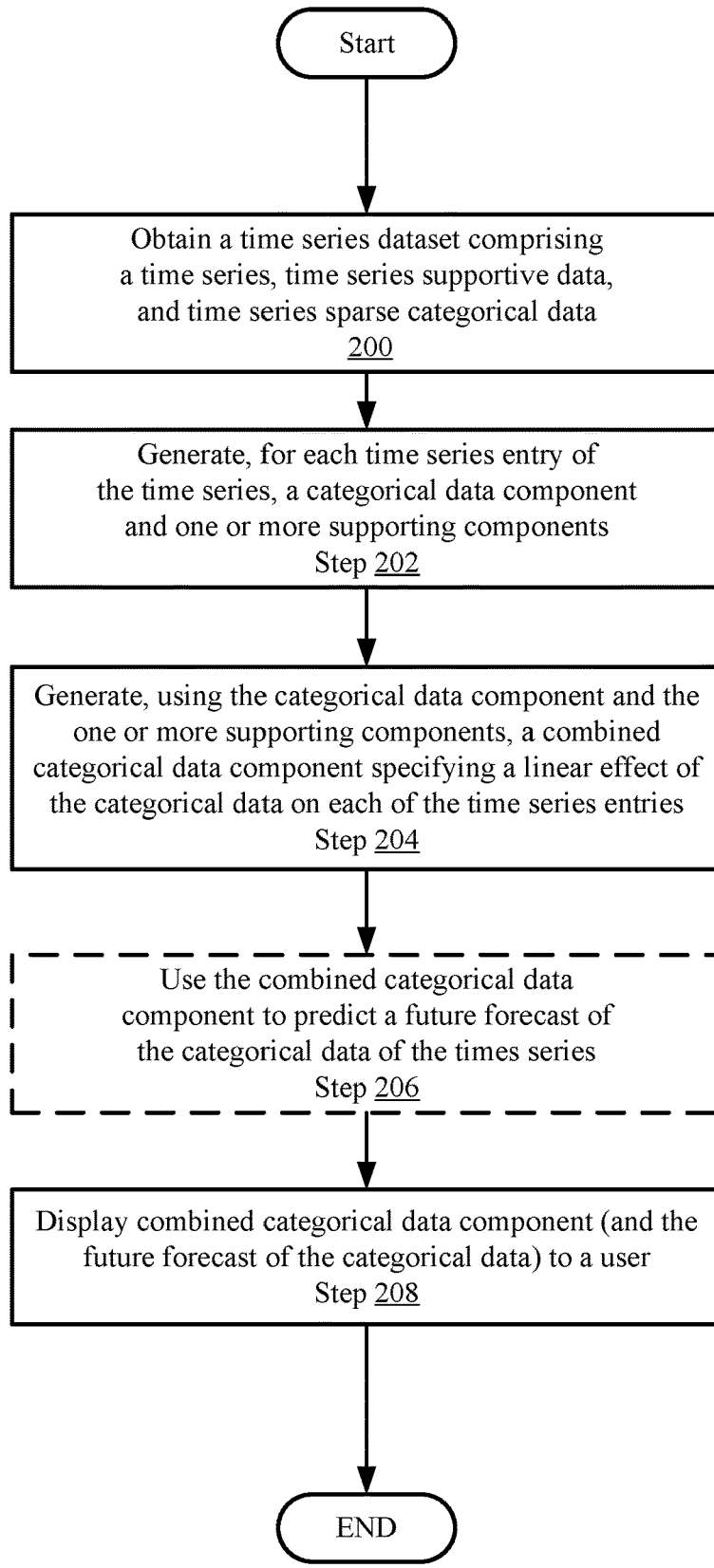
FIG. 2 shows a flowchart in accordance with one or more embodiments.

Turning now to FIG. 2, FIG. 2 shows a flowchart of a categorical data processing method in accordance to one or more embodiments disclosed herein. The method depicted in FIG. 2 may be performed to generate values specifying a linear effect of each event (and/or entry) associated with the categorical data on an entry (e.g., a particular day that the event occurred on) of the time series. The method shown in FIG. 2 may be performed, for example, by a combination of the categorical data processing engine (e.g., 108, FIG. 1) and the visualization engine (e.g., 110, FIG. 1). Other components of the system in FIG. 1 may perform all, or a portion, of the method of FIG. 2 without departing from the scope of the embodiments described herein.

While FIG. 2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a times series dataset (e.g., 104, FIG. 1) is obtained. The time series dataset may include a time series (e.g., 105, FIG. 1) and time series supportive data (e.g., 106, FIG. 1) and times series sparse categorical data (107, FIG. 1) associated with the time series. In one or more embodiments, the time series dataset may be obtained from any source (e.g., the storage (102) of FIG. 1, an external source such as a server, etc.) and may be of any size.

In Step 202, a categorical data component and one or more supporting components is generated for each entry (also referred to herein as "time series entry) of the time series. In one or more embodiments, the categorical data component may be generated using the times series sparse categorical data of the time series dataset. Additionally, multiple ones of the categorical data component may be generated for each entry of the time series without departing from the scope of one or more embodiments disclosed herein. For example, assume that the times series sparse categorical data specifies holidays that occur throughout the year. One of the generated categorical data component may be directed to the holiday of "New Year's Day" occurring on January $1^{st}$ of every year. Another one of the generated categorical data component may be directed to the holiday of "Christmas Day" occurring on December $25^{th}$ of every year. Visual examples of the categorical data component(s) are shown in more detail below in FIG. 3.1.

In one or more embodiments, upon generation, the categorical data component may be 1-hot encoded. For example, continuing with the above-discussed example, all entries of the "New Year's Day" categorical data component occurring on a January $1^{st}$ entry of the time series is given a value of "1" while all other entries of the "New Year's Day" categorical data component not occurring on a January $1^{st}$ entry of the time series is given a value of "0". This is also shown in more detail below in FIG. 3.1.

In one or more embodiments, the one or more supporting components may specify a trend (e.g., a change or development in a general direction) and/or a seasonality (e.g., a characteristic of a time series in which the data experiences regular and predictable changes that recur every calendar year) of the categorical data component. Each of the one or more supporting components may be a dummy variable with a value of 0 to n−1 (e.g., a dummy variable showing a linear trend) where n can be any positive and/or negative non-zero integer. Said another way, columns (i.e., components) containing dummy variables may be generated to show a trend and/or a seasonality of one or more of the generated categorical data component (e.g., a seasonality of the "Christmas Day" categorical data component. Visual examples of the one or more supporting components are shown in more detail below in FIG. 3.1.

In Step 206, a combined categorical data component specifying a linear effect of (e.g., containing values specifying a linear effect of) the categorical data on each of the time series entries is generated. In one or more embodiments, the combined categorical data component may be generated using the categorical data component and the one or more supporting components.

More specifically, initially, predicted historical values for each of the time series entries are generated by applying a linear regression model to the one or more supporting components and the categorical data component(s). The linear regression model is then fitted using the historical data in the time series and the time series supportive data obtained in Step 200 (e.g., the historical data in the time series and the time series supportive data is used as a target value for validating the predicted historical values). Once fitted, a coefficient component (e.g., weights) of the linear regression model is extracted for each of times series entries. The extracted weights from the linear regression model is then combined (e.g., multiplied) with the 1-hot encoded value of each entry of the categorical data component(s) to obtain the value specifying the linear effect of each event (and/or entry) associated with the categorical data on an entry (e.g., a particular day that the event occurred on) of the time series. This value specifying the linear effect is shown in more detail below in reference to FIGS. 3.1-3.2.

In one or more embodiments, the values of the categorical data component(s) are then aggregated (e.g., added) to obtain the combined categorical component. Said another way, if there is only a single one of the categorical data component generated in Step 202, the combined categorical data component will be based solely on the values associated with each entry of the single categorical data component. Alternatively, if multiple ones of the categorical data component is generated in Step 202, the combined categorical data component will be an aggregate of the values associated with each of the multiple categorical data components. An example showing multiple ones of the categorical data component being aggregated into a single combined categorical data component is shown below in FIGS. 3.1-3.4.

In Step 206, the combined categorical data component may be used as one or more parameters (e.g., variables) to predict a future forecast of the categorical data of the time series. Because the combined categorical data component includes values specifying a linear effect of the categorical data, the accuracy of the generated future forecast may advantageously be improved. For example, assume that the categorical data is directed to one or more holidays. Knowing the linear effect of a holiday on a particular data point (e.g., entry such as a particular day of a year) of the time series may advantageously generate a more accurate prediction of a future value (e.g., future forecast of the same day) of that data point of the time series. Additionally, inputting the linear effect information into a non-linear model can also allow one or more systems (e.g., data science systems) to take advantage of the non-linear effects of the model.

In Step 208, the combined categorical data component is displayed on a display to a user to enable the user to understand the linear effects of the categorical data on the time series. In one or more embodiments, the future forecast generated in Step 206 may also be displayed to the user with the combined categorical data component.

In one or more embodiments, the metadata as discussed above in reference to FIG. 1 may be used in combination with the time series, the time series supportive data, and/or the time series sparse categorical data in any of the above-discussed processes (e.g., Steps) of FIG. 2.

FIGS. 3.1-3.6 show implementation examples in accordance with one or more embodiments. In particular, FIGS. 3.1-3.6 show example visual representations of how the categorical data is processed to generate the values specifying a linear effect of each event (and/or entry) associated with the categorical data (e.g., Steps 200-204 of the process of FIG. 2). No parts of the visual representations shown in the implementation examples of FIGS. 3.1-3.6 should be used to limit how data associated with one or more embodiments disclosed herein is visually represented (e.g., visually displayed to a user).

Additionally, in one or more embodiments, all values within any of the tables shown in FIGS. 3.1-3.6 shown using ellipses (e.g., " . . . ") represent arbitrary values that need not be explicitly shown to understand one or more embodiments disclosed herein.

Beginning of Examples

Initially, FIG. 3.1 shows a table A (301A) (e.g., a first data structure) including: a series of time series entries (i.e., the "Dates" column of table A (301A)) associated with the time series; a first categorical data component (i.e., the "New Year's Day" column of table A (301A) where "New Year's Day" is a sub-category of the "holiday" category from which the time series sparse categorical data is based); a second categorical data component (i.e., the "Christmas" column of table (301A)); a supporting component (i.e., the "Trend" column of table A (301A)); and a set of predicted historical values (i.e., the "Historical" column of table A (301A)).

As seen in FIG. 3.1, the values of the first categorical data component (i.e., the "New Year's Day" column of table A (301A)) and the values of the second categorical data component (i.e., the "Christmas" column of table (301A)) are 1-hot encoded. More specifically, as seen in FIG. 3.1 and as a result of the 1-hot encoding, only the entry of "1/1/2015" under the "New Year's Day" column contains a value of "1" while all other entries that do not occur on "1/1" of a year are contain a value of "0".

Turning now to FIG. 3.2, FIG. 3.2 shows a table B (301B) (e.g., a second data structure) showing a set of weights extracted for each column of table A (301A) except for the "Dates" column of table A (301A). As seen in FIG. 301B, the weight (e.g., the liner effect value) of "New Year's Day" is "300" while the weight of "Christmas" is "−50". These weights represent the quantity effect of each holiday on the time series (e.g., the quantity effect of the holidays are +300/−50, respectfully of what would have been a target value (e.g., the historical data in the time series and/or the time series supportive data) if the holiday did not occur on a specific date (e.g., entry) of the time series).

In FIG. 3.3, the weights shown in table B (310B) FIG. 3.2 are combined (e.g., multiplied) with the 1-hot encoded values of each of the first and second categorical data components. As shown in FIG. 3.3, this results in every occurrence of "New Year's Day" within the time series to have a linear effect value of "300" while every occurrence of "Christmas" will have a linear effect value of "−50".

Turning now to FIG. 3.4, the data shown in table A (301A) is aggregated to obtain table C (301C) (e.g., a third data structure) shown in FIG. 3.4. More specifically, the data is aggregated to generate a combined categorical data component (i.e., the "Holidays Component" column in table C (301C)). As shown in FIG. 3.4, only entries of the time series (i.e., the "Dates" column in table C (301C)) associated with a holiday includes a linear effect value.

FIG. 3.5 shows another example of one or more embodiments. More specifically, as shown in FIG. 3.5, table D (301D) (e.g., a fourth data structure) includes: a combined categorical data component (i.e., the "Holidays Component" column in table D (301D)); and two categorical data components (i.e., the "National Day" and "Mid-Autumn Festival" columns of table D (301D)). As further shown in FIG. 3.5, "National Day" and "Mid-Autumn Festival" occurred on the same date (i.e., "10/1/2020) in the year 2020. As a result, the linear effect values of the two holidays are aggregated into a single value for the combined categorical data component.

Finally, turning now to FIG. 3.6, FIG. 3.6 shows yet another example of one or more embodiments. More specifically, FIG. 3.6 shows how the combined categorical data component can be used to determine an average effect of a particular categorical data ("New Year's Day" here in FIG. 3.6). In particular, as shown in table E (301E) (e.g., a fifth data structure) of FIG. 3.6, "New Year's Day" occurred twice between "1/1/2019" and "12/31/2020"; once on "1/1/2019" and once on "1/1/2020". The effect of "New Year's Day" on "1/1/2019" can be calculated to be 20 (i.e., target value of "30" minus the linear effect value of "10") while the effect of "New Year's Day" on "1/1/2020" can be calculated to be 0 (i.e., target value of "10" minus the linear effect value of "10"). As a result, the average effect of "New Year's Day" is determined to be 10 (i.e., (20+0)÷2).

End of Examples

Figure 4:
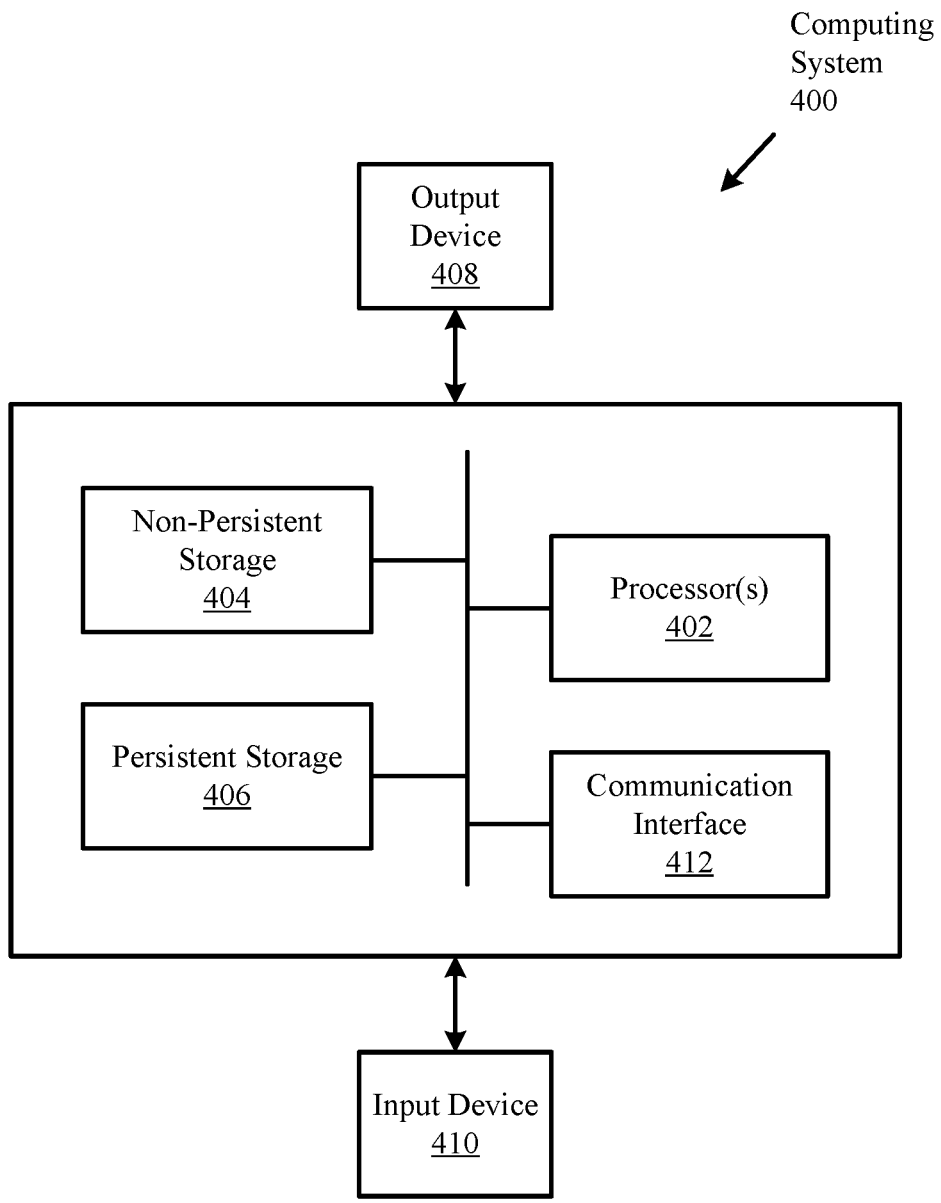
FIG. 4 shows a computer system in accordance to one or more embodiments.

FIG. 4 shows a computer system in accordance to one or more embodiments.

Embodiments disclosed herein may be implemented using computing devices and/or computing systems. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

The problems discussed above throughout this disclosure should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for processing categorical data in a time series, the method comprising:
    obtaining the time series, wherein the time series comprises a plurality of time series entries;
    generating, for each of the time series entries, a categorical data component and a supporting component, wherein the categorical data component is 1-hot encoded and each entry of the categorical data component comprises a 1-hot encoded value;

generating, using the supporting component and the categorical data component, a combined categorical data component specifying a linear effect of the categorical data component on each of the time series entries, wherein combining the supporting component and the categorical data component into the combined categorical data component comprises:

generating predicted historical values for each of the time series entries by applying a linear regression model to the supporting component and the categorical data component;

extracting, from the linear regression model, a weight for each of the time series entries; and combining the weight of each of the time series entries with the 1-hot encoded value of each of the entries of the categorical data component to obtain the combined categorical data component;

predicting, using the combined categorical data component, a future forecast of the categorical data of the time series; and displaying, on a display, the future forecast of the categorical data to a user.

2. The method of claim 1, wherein the categorical data component specifies a holiday.

3. The method of claim 1, wherein the categorical data component specifies at least one event selected from a group consisting of: sales discounts, promotions, anniversaries, and birthdays.

4. The method of claim 1, wherein
a plurality of categorical data components is generated for each of the time series entries,
a second linear regression model is applied to the supporting component and the plurality of categorical data components to generate second predicted historical values for each of the time series entries,
a second weight for each of the time series entries is extracted from the second linear regression model,
the second weight of each of the times series entries is combined with the 1-hot encoded value of each of the entries of each of the categorical data components, and
the method further comprises, after the weight of each of the times series entries is combined with the 1-hot encoded value of each of the entries of each of the categorical data components:
determining that a time series entry among the time series entries is associated with two or more non-zero entries of the categorical data components; and
adding, in response to the determination, the two or more non-zero entries of the categorical data components to obtain a value for an entry of the combined categorical component associated with the time series entry.

5. The method of claim 1, wherein
the time series further comprises:
time series supportive data, and
time series sparse categorical data specifying a category of the categorical data, wherein the category comprises sub-categories,
the 1-hot encoded value of each of the entries of the categorical data component is generated using the time series sparse categorical data, and
the categorical data component is based on one of the sub-categories.

6. The method of claim 5, wherein the linear regression model is fitted using the time series and the time series supportive data prior to the extraction of the weights from the linear regression model.

7. The method of claim 5, wherein:
the time series covers a first time period, and
the time series sparse categorical data covers a second time period longer than the first time period.

8. The method of claim 1, wherein the supporting component comprises a trend of the categorical data.

9. A non-transitory computer readable medium (CRM) comprising computer readable program code, which when executed by a computer processor enables the computer processor to perform a method for processing categorical data in a time series, the method comprising:

obtaining the time series, wherein the time series comprises a plurality of time series entries;

generating, for each of the time series entries, a categorical data component and a supporting component, wherein the categorical data component is 1-hot encoded and each entry of the categorical data component comprises a 1-hot encoded value;

generating, using the supporting component and the categorical data component, a combined categorical data component specifying a linear effect of the categorical data component on each of the time series entries, wherein combining the supporting component and the categorical data component into the combined categorical data component comprises:

generating predicted historical values for each of the time series entries by applying a linear regression model to the supporting component and the categorical data component;

extracting, from the linear regression model, a weight for each of the time series entries; and combining the weight of each of the time series entries with the 1-hot encoded value of each of the entries of the categorical data component to obtain the combined categorical data component;

predicting, using the combined categorical data component, a future forecast of the categorical data of the time series; and displaying, on a display, the future forecast of the categorical data to a user.

10. The CRM of claim 9, wherein the categorical data component specifies a holiday.

11. The CRM of claim 9, wherein the categorical data component specifies at least one event selected from a group consisting of: sales discounts, promotions, anniversaries, and birthdays.

12. A system comprising:
a memory; and
a processor coupled to the memory, wherein the processor is configured to execute a method for processing categorical data in a time series comprising:

obtaining the time series, wherein the time series comprises a plurality of time series entries;

generating, for each of the time series entries, a categorical data component and a supporting component, wherein the categorical data component is 1-hot encoded and each entry of the categorical data component comprises a 1-hot encoded value;

generating, using the supporting component and the categorical data component, a combined categorical data component specifying a linear effect of the categorical data component on each of the time series entries, wherein combining the supporting component and the categorical data component into the combined categorical data component comprises:

generating predicted historical values for each of the time series entries by applying a linear regression model to the supporting component and the categorical data component;

extracting, from the linear regression model, a weight for each of the time series entries; and combining the weight of each of the time series entries with the 1-hot encoded value of each of the entries of the categorical data component to obtain the combined categorical data component;

predicting, using the combined categorical data component, a future forecast of the categorical data of the time series; and displaying, on a display, the future forecast of the categorical data to a user.

13. The system of claim 12, wherein the categorical data component specifies a holiday.

14. The system of claim 12, wherein the categorical data component specifies at least one event selected from a group consisting of: sales discounts, promotions, anniversaries, and birthdays.

\* \* \* \* \*